Dec. 26, 1967     R. SOLISCH ET AL     3,360,326
HIGH-SPEED VARIFOCAL OBJECTIVE

Filed Feb. 24, 1965               2 Sheets-Sheet 1

Inventors:
Rudolf SOLISCH
Walter WÖLTCHE
BY
Karl F. Ross
Attorney

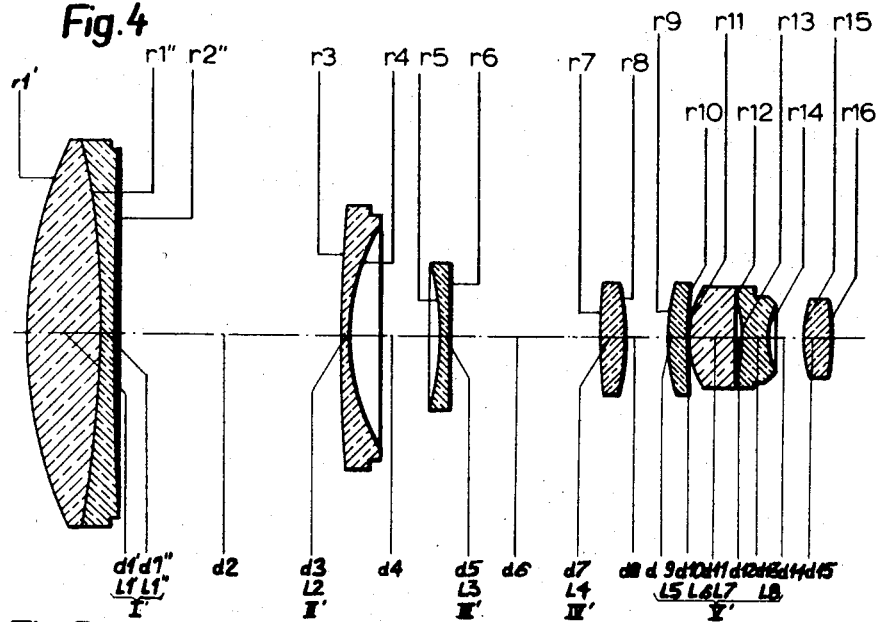
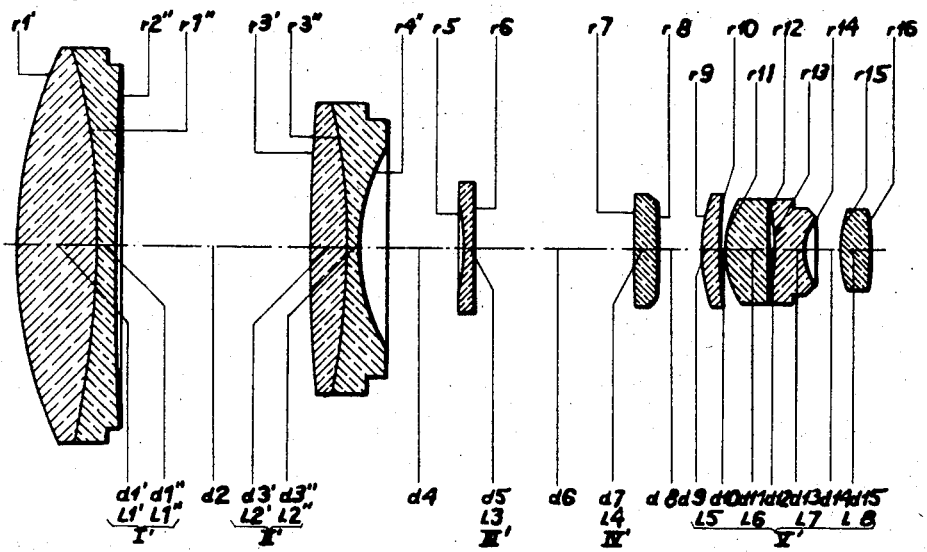

United States Patent Office 3,360,326
Patented Dec. 26, 1967

3,360,326
HIGH-SPEED VARIFOCAL OBJECTIVE
Rudolf Solisch, Göttingen, and Walter Wöltche, Bad Kreuznach, Germany, assignors to Isco Optische Werke G.m.b.H., Göttingen, Weende, Germany, a corporation of Germany
Filed Feb. 24, 1965, Ser. No. 434,765
3 Claims. (Cl. 350—184)

ABSTRACT OF THE DISCLOSURE

Varifocal front attachment for a basic objective composed of four singlets, the attachment consisting of a fixed positive front component, a movable negative second component, a movable negative third component, and a fixed positive fourth component, at least the last two components being singlets.

---

This application is a continuation-in-part of our copending application Ser. No. 159,392, filed Dec. 14, 1961, now abandoned.

Our present invention relates to varifocal objectives of the type comprising a multicomponent basic objective and a multicomponent front attachment therefor, the latter including one or more lens members which are axially displaceable to vary the focal length of the system.

An object of the present invention is to provide a high-power objective system of this type in which, however, the number of lens elements is considerably reduced in comparison with optically equivalent varifocal objectives of the prior art.

More particularly, our invention aims at providing a system of this type in which, with a total of eight air-spaced components, all except at most one or two of them are simple lenses.

The foregoing objects are realized, in accordance with this invention, by the provision of a varifocal front attachment consisting of four air-spaced componets of which the outer two, i.e. the first and the fourth as counted from the object side of the system, are positively refractive and stationary while the inner two, i.e. the second and the third, are negatively refractive and axially movable, the third and fourth components being each an uncemented singlet whereas the second component has the shape of a meniscus turning its concavity toward the concave forward surface of the third component.

We have further established that a system of this description can be readily corrected for the elimination of residual aberrations and improvement of its performance, especially in the region of the longer focal lengths with a magnification greater than unity, if the first component of the varifocal attachment is provided with a dispersive cemented surface turning its concavity toward the object side of the system, i.e. the side of the longer light rays. Similar advantages in the region of the shorter focal lengths, i.e. for magnification less than unity, can be realized by the provision of a collective cemented surface in the second component of the attachment, the latter surface also turning its concavity toward the object side.

The basic or principal objective associated with this attachment is advantageously provided with two inner lens members, of opposite refractivity, which are separated by a small dispersive air space having the shape of a thin positive (preferably plano-convex) lens.

Figure 1:
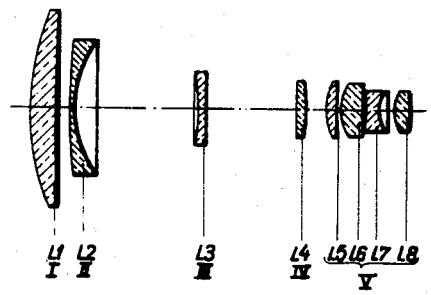
Figure 2:
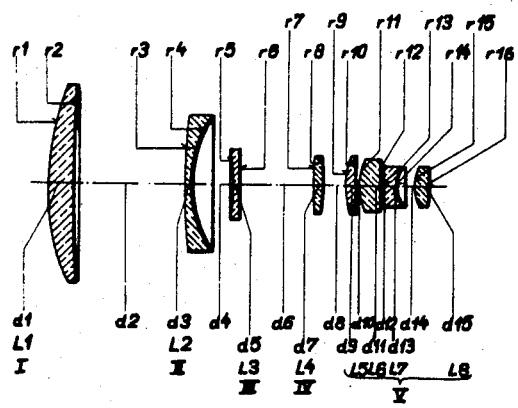
Figure 3:
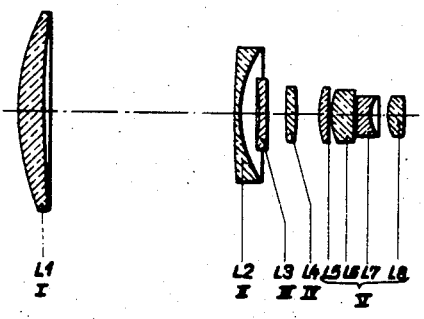

The invention will be described in greater detail with reference to the accompanying drawing in which:

FIGS. 1–3 illustrate an objective system according to the invention in three different positions of the movable components of its varifocal front attachment;

FIG. 4, drawn to a larger scale, illustrates a modified system in the position of FIG. 2; and FIG. 5, drawn to the same scale as FIG. 4, shows another modification in the same position.

The system shown in FIGS. 1–3 comprises a varifocal attachment, constituted by four air-spaced components I–IV, and a principal objective V. Component I is a positive singlet L1 (radii $r1$, $r2$ and thickness $d1$) separated by a variable air space $d2$ from the second component II which is also a single lens L2 in the shape of a negative meniscus with radii $r3$, $r4$ and thickness $d3$. Another variable air space $d4$ intervenes between this movable component and the next, likewise movable component III which is also a single negative lens L3, of plano-concave configuration, having radii $r5$, $r6$ and thickness $d5$. The last component IV of the attachment, which follows component III by a further variable air space $d6$, is again a positive singlet L4 with radii $r7$, $r8$ and thickness $d7$. This attachment is separated by a fixed air space $d8$ from the basic obective V which consists of four air-spaced singlets including a positive lens L5 (radii $r9$, $r10$ and thickness $d9$), another positive lens L6 (radii $r11$, $r12$, thickness $d11$) separated from the lens L5 by an air space $d10$, a third lens L7 (radii $r13$, $r14$ and thickness $d13$) which defines with lens L6 a narrow plano-convex air space of axial thickness $d12$ and a fourth lens L8 (radii $r15$, $r16$ and thickness $d15$) whose spacing from lens L7 has been designated $d14$.

It will be noted that the two movable negative components II and III turn their concave sides toward each other and that all components in FIGS. 1–3 are uncemented lenses. FIG. 1 illustrates the position of the movable lenses L2, L3 for the shortest focal length, FIG. 2 shows these lenses in a position of median focal length and FIG. 3 represents the system when adjusted for maximum focal length.

The system shown in FIGS. 1–3 has a relative aperture of 1:1.8 and a varifocal range of about 1:3.3. Representative values of its radii $r1$–$r16$ and its thicknesses and separations $d1$–$d15$, based upon a mean focal length of numerical value 100 with a corresponding back-focal distance of 37.2, are given in the following Table A together with the refractive indices $n_d$ and the Abbé numbers $\nu$:

TABLE A

| Component | Lens | Radii | Thicknesses and Separations | $n_d$ | $\nu$ |
|---|---|---|---|---|---|
| I | L1 | $r1 = +291.94$ <br> $r2 = +1621.97$ | $d1 = 31.25$ | 1.71615 | 53.7 |
|   |    |          | $d2 = 131.58$ | Variable Air Space | |
| II | L2 | $r3 = +924.46$ <br> $r4 = +136.48$ | $d3 = 6.25$ | 1.64648 | 47.5 |
|   |    |          | $d4 = 50.20$ | Variable Air Space | |
| III | L3 | $r5 = -173.49$ <br> $r6 = \infty$ | $d5 = 6.25$ | 1.62410 | 36.1 |
|   |    |          | $d6 = 87.01$ | Variable Air Space | |
| IV | L4 | $r7 = +587.81$ <br> $r8 = -225.62$ | $d7 = 12.50$ | 1.52010 | 65.0 |
|   |    |          | $d8 = 25.00$ | Air Space | |
| V | L5 | $r9 = +91.01$ <br> $r10 = +250.05$ | $d9 = 11.69$ | 1.68081 | 55.3 |
|   |    |          | $d10 = 0.50$ | Air Space | |
|   | L6 | $r11 = +57.13$ <br> $r12 = \infty$ | $d11 = 28.75$ | 1.69400 | 54.6 |
|   |    |          | $d12 = 0.81$ | Air Space | |
|   | L7 | $r13 = -424.87$ <br> $r14 = +32.67$ | $d13 = 16.38$ | 1.76846 | 26.8 |
|   |    |          | $d14 = 20.13$ | Air Space | |
|   | L8 | $r15 = +59.04$ <br> $r16 = -168.78$ | $d15 = 18.07$ | 1.67341 | 46.9 |
|   |    |          | $d_{total} = 446.37$ | | |

The air spaces $d2$, $d4$ and $d6$ may be varied concurrently in order to change the overall focal length of the system between a minimum value $f_{min}=56.25$ and a maximum value $f_{max}=187.56$ in accordance with the following table:

TABLE A1

| Focal Lengths | Variable Air Spaces | | |
|---|---|---|---|
| | $d2$ | $d4$ | $d6$ |
| 56.25 | 15.44 | 147.02 | 106.33 |
| 100 | 131.58 | 50.20 | 87.01 |
| 187.56 | 221.83 | 25.44 | 21.52 |

The system of FIG. 4 comprises a varifocal attachment and a basic objective generally similar to those of FIGS. 1–3, except that the sample lens L1 constituting the front component I of the preceding embodiment has been replaced by a doublet L1' (radii $r1'$, $r1''$ and thickness $d1'$), L1'' (radii $r1''$, $r2''$ and thickness $d1''$) constituting the component I'. This system, representative values of whose parameters $r1$, $r1''$, $r2''$, $r3$–$r16$ and $d1'$, $d1''$, $d2$–$d15$ as well as refractive indices $n_d$ and Abbé numbers $\nu$ are listed in the following Table B, is of the same aperture ratio and back-focal distance as that of the preceding figures but shows improved performance particularly in the region of the longer focal lengths.

TABLE B

| Component | Lens | Radii | Thicknesses and Separations | $n_d$ | $\nu$ |
|---|---|---|---|---|---|
| I' | L1' | $r1'=+282.01$ | $d1'=43.74$ | 1.62033 | 54.8 |
| | L1'' | $r1''=-624.89$ | $d1''=9.37$ | 1.76864 | 26.8 |
| | | $r2''=+15872.12$ | $d2=132.58$ | Variable Air Space | |
| II | L2 | $r3=+944.19$ | $d3=6.25$ | 1.62287 | 60.1 |
| | | $r4=+132.61$ | $d4=51.93$ | Variable Air Space | |
| III | L3 | $r5=-173.43$ | $d5=6.25$ | 1.62287 | 60.1 |
| | | $r6=\infty$ | $d6=90.17$ | Variable Air Space | |
| IV | L4 | $r7=+587.61$ | $d7=12.50$ | 1.52010 | 65.0 |
| | | $r8=-225.55$ | $d8=25.00$ | Air Space | |
| V | L5 | $r9=+90.98$ | $d9=11.69$ | 1.68081 | 55.3 |
| | | $r10=+249.96$ | $d10=0.50$ | Air Space | |
| | L6 | $r11=+57.11$ | $d11=28.74$ | 1.69400 | 54.6 |
| | | $r12=\infty$ | $d12=0.81$ | Air Space | |
| | L7 | $r13=-424.73$ | $d13=16.37$ | 1.76846 | 26.8 |
| | | $r14=+32.66$ | $d14=20.12$ | Air Space | |
| | L8 | $r15=+59.02$ | $d15=18.06$ | 1.67341 | 46.9 |
| | | $r16=-168.73$ | $d_{total}=474.08$ | | |

The air spaces $d2$, $d4$ and $d6$ may again be varied concurrently in order to change the overall focal length of this system between the minimum value $f_{min}=56.25$ and the maximum value $f_{max}=187.56$ in accordance with the following table:

TABLE B1

| Focal Lengths | Variable Air Spaces | | |
|---|---|---|---|
| | $d2$ | $d4$ | $d6$ |
| 56.25 | 13.39 | 154.49 | 106.80 |
| 100 | 132.58 | 51.93 | 90.17 |
| 187.49 | 227.18 | 19.16 | 28.34 |

The further modification shown in FIG. 5 differs from that of FIG. 4 in that the second component II' of the attachment now also consists of two cemented lenses L2' (radii $r3'$, $r3''$ and thickness $d3'$) and L2'' (radii $r3''$, $r4$ and thickness $d3''$). This modification also exhibits improved performance in the region of the shorter focal lengths. Representative values for the parameters $r1'$, $r1''$, $r2''$, $r3'$, $r3''$, $r4''$, $r5$–$r16$, $d1'$, $d1''$, $d2$, $d3'$, $d3''$, $d4$–$d15$, refractive indices $n_d$ and Abbé numbers $\nu$ of the system of FIG. 5 have been compiled in the following Table C.

TABLE C

| Component | Lens | Radii | Thicknesses and Separations | $n_d$ | $\nu$ |
|---|---|---|---|---|---|
| I | L1' | $r1'=+270.37$ | $d1'=50.01$ | 1.62067 | 49.5 |
| | L1'' | $r1''=-438.45$ | $d1''=9.38$ | 1.76846 | 26.8 |
| | | $r2''=+15883.63$ | $d2=122.08$ | Variable Air Space | |
| II | L2' | $r3'=+944.50$ | $d3'=21.88$ | 1.76846 | 26.8 |
| | L2'' | $r3''=-375.06$ | $d3''=6.25$ | 1.62287 | 60.1 |
| | | $r4''=+111.99$ | $d4=49.88$ | Variable Air Space | |
| III | L3 | $r5=-173.49$ | $d5=6.25$ | 1.62410 | 36.1 |
| | | $r6=\infty$ | $d6=96.89$ | Variable Air Space | |
| IV | L4 | $r7=+587.81$ | $d7=12.50$ | 1.52010 | 65.0 |
| | | $r8=-225.62$ | $d8=25.00$ | Air Space | |
| V | L5 | $r9=+91.01$ | $d9=11.69$ | 1.68081 | 55.3 |
| | | $r10=+250.04$ | $d10=0.50$ | Air Space | |
| | L6 | $r11=+57.13$ | $d11=28.75$ | 1.69400 | 54.6 |
| | | $r12=\infty$ | $d12=0.81$ | Air Space | |
| | L7 | $r13=-424.87$ | $d13=16.38$ | 1.76846 | 26.8 |
| | | $r14=+32.67$ | $d14=20.13$ | Air Space | |
| | L8 | $r15=+59.04$ | $d15=18.07$ | 1.67341 | 46.9 |
| | | $r16=-168.78$ | $d_{total}=496.45$ | | |

In this system, too, the air spaces $d2$, $d4$ and $d6$ may be varied concurrently in order to change its overall focal length between the minimum value $f_{min}=56.25$ and the maximum value $f_{max}=187.56$ in accordance with the following table:

TABLE C1

| Focal Lengths | Variable Air Spaces | | |
|---|---|---|---|
| | $d2$ | $d4$ | $d6$ |
| 56.25 | 7.50 | 149.40 | 111.95 |
| 100 | 122.08 | 49.88 | 96.89 |
| 187.49 | 213.23 | 18.50 | 37.07 |

We claim:
1. An objective system comprising a principal objective and an attachment forwardly of said principal objective, said attachment and said principal objective consisting each of four air-spaced components, the components of said attachment including a fixed positive first component, a negative second component, a negative single-lens third component and a fixed positive single-lens fourth component, said second and third components being jointly displaceable into two limiting positions defining extreme values for the overall focal length and an intermediate position defining a mean focal length; said first and second components being singlets, the lenses L1 to L4 of said attachment and the lenses L5 to L8 of said principal objective having radii $r1$ to $r16$ and thicknesses and separations $d1$ to $d15$ whose numerical values, based upon a numerical value of 100 for the mean focal length of the system, along with refractive indices $n_d$ and Abbé numbers $\nu$ are substantially as given in the following table:

| Lens | Radii | Thicknesses and Separations | $n_d$ | $\nu$ |
|---|---|---|---|---|
| L1 | $r1 = +291.94$ | $d1 = 31.25$ | 1.71615 | 53.7 |
|    | $r2 = +1621.97$ | $d2 = 131.58$ | Variable Air Space | |
| L2 | $r3 = +924.46$ | $d3 = 6.25$ | 1.64648 | 47.5 |
|    | $r4 = +136.48$ | $d4 = 50.20$ | Variable Air Space | |
| L3 | $r5 = -173.49$ | $d5 = 6.25$ | 1.62410 | 36.1 |
|    | $r6 = \infty$ | $d6 = 87.01$ | Variable Air Space | |
| L4 | $r7 = +587.81$ | $d7 = 12.50$ | 1.52010 | 65.0 |
|    | $r8 = -225.62$ | $d8 = 25.00$ | Air Space | |
| L5 | $r9 = +91.01$ | $d9 = 11.69$ | 1.68081 | 55.3 |
|    | $r10 = +250.05$ | $d10 = 0.50$ | Air Space | |
| L6 | $r11 = +57.13$ | $d11 = 28.75$ | 1.69400 | 54.6 |
|    | $r12 = \infty$ | $d12 = 0.81$ | Air Space | |
| L7 | $r13 = -424.87$ | $d13 = 16.38$ | 1.76846 | 26.8 |
|    | $r14 = +32.67$ | $d14 = 20.13$ | Air Space | |
| L8 | $r15 = +59.04$ | $d15 = 18.07$ | 1.67341 | 46.9 |
|    | $r16 = -168.78$ | | | |

2. An objective system comprising a principal objective and an attachment forwardly of said principal objective, said attachment and said principal objective consisting each of four air-spaced components, the components of said attachment including a fixed positive first component, a negative second component, a negative single-lens third component and a fixed positive single-lens fourth component, said second and third components being jointly displaceable into two limiting positions defining extreme values for the overall focal length and an intermediate position defining a mean focal length; said first component being a doublet with a dispersive cemented surface having a forwardly facing concave side, said second component being a singlet, the lenses L1', L1'', L2, L3, L4 of said attachment and L5 to L8 of said principal objective having radii $r1'$, $r1''$, $r2''$, $r3$ to $r16$ and thicknesses and separations $d1'$, $d1''$, $d2$ to $d15$ whose numerical values, based upon a numerical value of 100 for the mean focal length of the system, along with refractive indices $n_d$ and Abbé numbers $\nu$ are substantially as given in the following table:

| Lens | Radii | Thicknesses and Separations | $n_d$ | $\nu$ |
|---|---|---|---|---|
| L1' | $r1' = +282.01$ | $d1' = 43.74$ | 1.62033 | 54.8 |
| L1'' | $r1'' = -624.89$ | $d1'' = 9.37$ | 1.76864 | 26.8 |
|     | $r2'' = +15872.12$ | $d2 = 132.58$ | Variable Air Space | |
| L2 | $r3 = +944.19$ | $d3 = 6.25$ | 1.62287 | 60.1 |
|    | $r4 = +132.61$ | $d4 = 51.93$ | Variable Air Space | |
| L3 | $r5 = -173.43$ | $d5 = 6.25$ | 1.62287 | 60.1 |
|    | $r6 = \infty$ | $d6 = 90.17$ | Variable Air Space | |
| L4 | $r7 = +587.61$ | $d7 = 12.50$ | 1.52010 | 65.0 |
|    | $r8 = -225.55$ | $d8 = 25.00$ | Air Space | |
| L5 | $r9 = +90.98$ | $d9 = 11.69$ | 1.68081 | 55.3 |
|    | $r10 = +249.96$ | $d10 = 0.50$ | Air Space | |
| L6 | $r11 = +57.11$ | $d11 = 28.74$ | 1.69400 | 54.6 |
|    | $r12 = \infty$ | $d12 = 0.81$ | Air Space | |
| L7 | $r13 = -424.73$ | $d13 = 16.37$ | 1.76846 | 26.8 |
|    | $r14 = +32.66$ | $d14 = 20.12$ | Air Space | |
| L8 | $r15 = +59.02$ | $d15 = 18.06$ | 1.67341 | 46.9 |
|    | $r16 = -168.73$ | | | |

3. An objective system comprising a principal objective and an attachment forwardly of said principal objective, said attachment and said principal objective consisting each of four air-spaced components, the components of said attachment including a fixed positive first component, a negative second component, a negative single-lens third component and a fixed positive single-lens fourth component, said second and third components being jointly displaceable into two limiting positions defining extreme values for the overall focal length and an intermediate position defining a mean focal length; said first component being a doublet with a dispersive cemented surface having a forwardly facing concave side, said second component being a doublet with a collective cemented surface having a forwardly facing concave side, the lenses L1', L1'', L2', L2'', L3, L4 of said attachment and L5 to L8 of said principal objective having radii $r1'$, $r1''$, $r2''$, $r3'$, $r3''$, $r4$, $r5$ to $r16$ and thickness and separations $d1'$, $d1''$, $d2$, $d3'$, $d3''$, $d4$ to $d15$ whose numerical values, based upon a numerical value of 100 for the focal length of the system, along with refractive indices $n_d$ and Abbé numbers $\nu$ are substantially as given in the following table:

| Lens | Radii | Thicknesses and Separations | $n_d$ | $\nu$ |
|---|---|---|---|---|
| L1' | $r1' = +270.37$ | $d1' = 50.01$ | 1.62067 | 49.5 |
| L1'' | $r1'' = -438.45$ | $d1'' = 9.38$ | 1.76846 | 26.8 |
|     | $r2'' = +15883.63$ | $d2 = 122.08$ | Variable Air Space | |
| L2' | $r3' = +944.50$ | $d3' = 21.88$ | 1.76846 | 26.8 |
| L2'' | $r3'' = -375.06$ | $d3'' = 6.25$ | 1.62287 | 60.1 |
|     | $r4'' = +111.99$ | $d4 = 49.88$ | Variable Air Space | |
| L3 | $r5 = -173.49$ | $d5 = 6.25$ | 1.62410 | 36.1 |
|    | $r6 = \infty$ | $d6 = 96.89$ | Variable Air Space | |
| L4 | $r7 = +587.81$ | $d7 = 12.50$ | 1.52010 | 65.0 |
|    | $r8 = -225.62$ | $d8 = 25.00$ | Air Space | |
| L5 | $r9 = +91.01$ | $d9 = 11.69$ | 1.68081 | 55.3 |
|    | $r10 = +250.04$ | $d10 = 0.50$ | Air Space | |
| L6 | $r11 = +57.13$ | $d11 = 28.75$ | 1.69400 | 54.6 |
|    | $r12 = \infty$ | $d12 = 0.81$ | Air Space | |
| L7 | $r13 = -424.87$ | $d13 = 16.38$ | 1.76846 | 26.8 |
|    | $r14 = +32.67$ | $d14 = 20.13$ | Air Space | |
| L8 | $r15 = +59.04$ | $d15 = 18.07$ | 1.67341 | 46.9 |
|    | $r16 = -168.78$ | | | |

References Cited

UNITED STATES PATENTS 2,663,223 12/1953 Hopkins _____ 350—184
3,000,259 9/1961 Turula et al. _____ 350—186
3,057,257 10/1962 Klemt et al. _____ 350—184

JEWELL H. PEDERSEN, *Primary Examiner.*

R. J. STERN, *Assistant Examiner.*